March 10, 1936.     J. SUSSMAN     2,033,596

PHOTOGRAPHIC LENS SYSTEM

Filed March 8, 1935

INVENTOR
Jacob Sussman
BY
ATTORNEY

Patented Mar. 10, 1936

2,033,596

UNITED STATES PATENT OFFICE 2,033,596

PHOTOGRAPHIC LENS SYSTEM

Jacob Sussman, New York, N. Y., assignor to The Eye-Lens Corporation, a corporation of New York Application March 8, 1935, Serial No. 10,116

4 Claims. (Cl. 88—57)

It is the object of this invention to provide a high speed lens system particularly applicable to cameras or projection apparatus, which will give a wider field than the ordinary lens system, and at the same time result in sharp focus of objects close to the lens and substantially equal definition as to objects in the far background. A further object is to provide a co-acting collective and objective lens combination capable of relative separation and retraction to vary the size of any object-image received upon the focal plane, without change in the distance between the lens and the object and whilst retaining sharp background focus. A further object is to provide in such combination a characteristic of wide field and sharp definition at extremely short distances from the object, as in photography of the eye, with the fore collective lens 30 mm. or less from the object.

Figure 1:
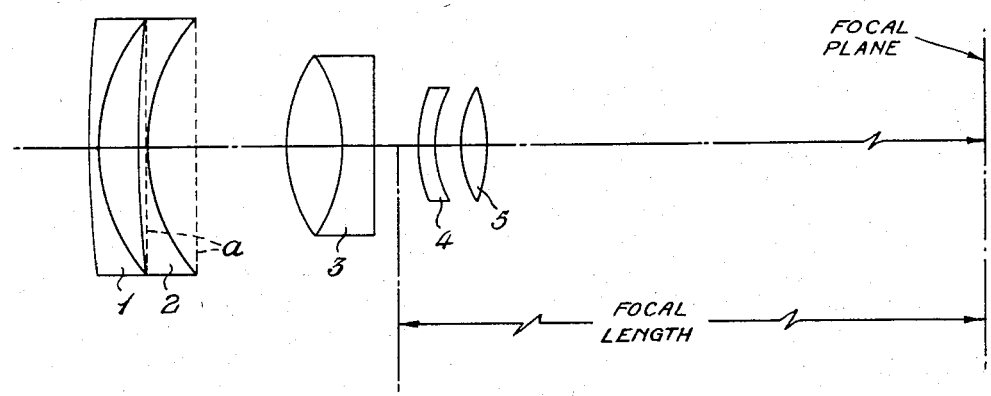
Figure 2:
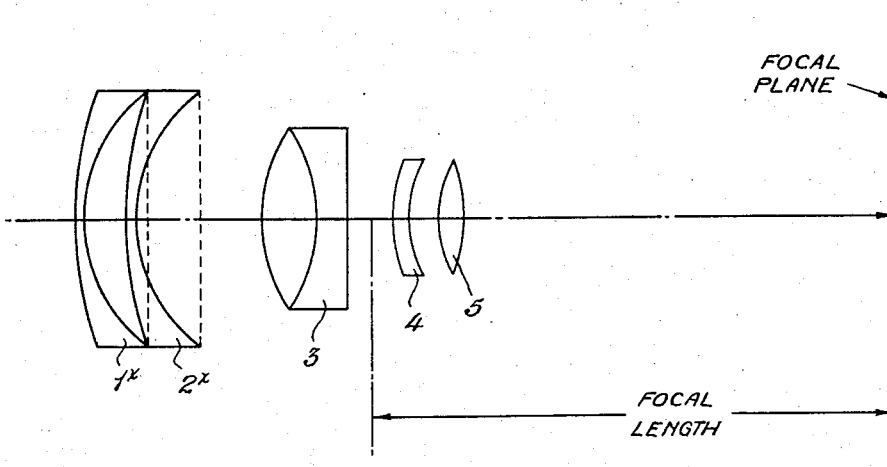

The invention will be described with reference to the accompanying drawing, in which Fig. 1 is a diagrammatic view in axial section of a lens system embodying the invention, and Fig. 2 is a view similar to the preceding figure showing a modification of the system.

Each lens system illustrated comprises two sections, one purely negative and collective and the second section objective. Referring to Fig. 1, there is shown a standard objective lens assembly consisting of the doublet 3 and successive meniscus and bi-convex members 4 and 5. In front, and co-axial with the objective, are two concave-spheric lenses of equal dioptric power each being a single negative element with its concavity facing the objective. In the form shown in Fig. 1, each concave-spherical lens 1, 2, has a peripheral thickness of 3/8", a diameter of 1 15/16" and a dioptric power of $-14\frac{1}{2}+1$. The lenses 1, 2 are placed in contact so that the plus surface of lens 2 extends into the cavity of lens 1, a relatively deep air space thus being formed between them. In the drawing the dotted line $a$ indicates the rear peripheral edge of each of said lenses. In the embodiment of Fig. 1 lens 2 is spaced from the objective doublet 3 approximately 11/16".

The objective in said embodiment has a 50 mm. back focal length with an aperture of F.1.5. By the combination, however the back focal length is increased to approximately 125 mm.

In the relative positions of the lens assembly 1, 2, and the objective assembly, sharp focus is secured of foreground objects say six feet from the lens, with a characteristic of focus to infinity with very remarkable freedom from coma or distortion. In other words with the combination used in a camera both foreground objects and background objects are secured with sharp definition, according to their true values so that the image is like that received by a normal eye. At the same time the speed of the standard objective is greatly increased by its combination with lenses 1, 2. The light collected with the image by wide angle lens 1 is condensed thereby and re-condensed by lens 2 with low loss, due to the very high dioptric power of the concave face of each lens which may exceed fourteen times the dioptric power of the convex face. The double minimizing of the image forwardly of the objective by the wide angle lens combination 1, 2 appears to effect ideal coaction between said combination and the objective, in counteracting or neutralizing aberrations in the one by the other. This result is secured without dependence upon a particular optical glass for the lenses 1, 2, and crown glass may be employed.

As stated above the relative positions of the objective and lens assembly 1, 2 shown in Figure 1 give a wide field with sharp focus from infinity to a short distance from the lens combination, say six feet. It is also an important characteristic of the combination that variation in the size of an object focused upon film, for example, may be secured by bodily and relative axial movement of the lens assembly 1, 2 and the objective. When the assembly 1, 2 is adjusted in a direction away from the objective the object in direct focus is decreased in size and the field widened, a reverse effect being secured when the assembly 1, 2 is adjusted in a direction toward the objective. This characteristic is especially valuable in motion picture photography because by it the camera may remain in position and objects "brought toward the lens" or minimized, as desired, by the adjustment described.

It is to be noted that each lens 1, 2 is formed with a slightly curved ray-receiving face, the dioptric measurement being +1. However the lenses may be plano-concave, if desired, the field being correspondingly reduced.

In the embodiment shown in Fig. 2 the same type of standard objective is shown as that of Fig. 1 and the same numerical designations are used. The concave-spherical lenses 1×, 2×, are modified by greater curvature, the dioptric power being $-16+5$. In this form a wider field is secured than with the corresponding lenses 1, 2, without loss of depth but with some sacrifice of light. To substantially increase the curvatures, is inadvisable because of the barrel effect.

It will be understood that more than two of the concave-spherical lenses, preceding the objective, may be employed if desired, although I have found the best results are obtained with the two. The said lenses should be in contact, for by such association the desired sharp definition of both near foreground objects and far background objects is obtained, also the second lens in contact with the first widens the field whereas when separated the field is narrowed. However the narrowing of the field can be compensated for by increasing the diameter of the front concave-spherical lens proportionately to the spacing between it and its coacting concave spherical lens, and therefore in the claims I state that the said lenses "are substantially in contact at their peripheral edges", i. e., either in contact or close together, and by "close together" I mean that if spacing is used the spacing be substantially less than one inch. Also in the claims by the phrase "like concavo-spherical lenses" I exclude doublets made up of double concave with double convex or plano convex elements. For best results the said two coacting lenses should have equal curvatures and thickness and be in other respects identical. However within reasonable limits the diopter measurements of one lens may vary relatively to the second lens. For example, a front lens having a curvature of D.—12+1 and a rear lens of D.—11+2 would give good results.

By adjusting the concave-spherical lens section in direction away from the objective to give wider field the back focal length is shortened and accordingly the objective must be moved toward the focal plane, for proper focus. The reverse adjustment narrows the field. The same result as to wider field is obtained by increasing the curvature of the lenses comprising the concave-spherical section, as shown in Fig. 2, decreasing the back focal length of the objective.

It is to be noted that by reason of my construction it is not only possible but desirable to provide a power of the concave surface of each of the two coacting concave-spherical lenses exceeding fourteen times the power of the convex surface.

Having described my invention, which I claim and desire to secure by Letters Patent is as follows:

1. The combination of a standard photographic objective lens system, of a lens system in front of it comprising a plurality of concave-spherical lenses substantially equal in dioptric power, placed substantially in contact at their peripheral edges, each of said lenses being a body composed of a single negative element with its concavity facing toward and co-axial with the objective lens system and spaced therefrom in accordance with the focal length thereof.

2. The combination with a standard photographic objective lens system, of a lens system in front of it comprising a plurality of similar concave spherical lenses placed substantially in contact at their peripheral edges, each of said lenses being constructed as a body of negative elemental form with the concave faces of said concave spherical lenses facing toward and co-axial with the objective lens system and spaced therefrom in accordance with the focal length thereof.

3. The combination with a standard photographic objective lens system, of a lens system in front of it comprising a plurality of similar concavo-convex spherical lenses in mutual contact at their peripheral edges, the convex face of the rear lens entering the concavity of the lens in front thereof, the opposed convex and concave lens walls being separated by an air space, and the concavities facing the objective lens system and co-axial therewith, the said concavo-convex spherical lenses being spaced from the objective lens system in accordance with the focal length thereof, the elemental form of said concavo-convex spherical lenses being negative.

4. The combination with a standard photographic objective lens system, of a lens system in front of it comprising a plurality of similar concavo spherical lenses placed in substantial contact at their peripheral edges, the curvature of each lens being not less than D.—7½ and not exceeding D.—16, each lens being constructed as a body of negative elemental form and the concave surfaces thereof facing toward and co-axial with the objective lens system, and spaced therefrom in accordance with the focal length thereof.

JACOB SUSSMAN.